US008881127B2

(12) United States Patent
Mizrachi et al.

(10) Patent No.: US 8,881,127 B2
(45) Date of Patent: Nov. 4, 2014

(54) SYSTEMS AND METHODS TO AUTOMATICALLY GENERATE CLASSES FROM API SOURCE CODE

(75) Inventors: Assaf Mizrachi, Nesher (IL); Elad Razy, Haifa (IL); Yinon Avraham, Kibbutz Dalia (IL); Oded Goldsmidt, Karmeil (IL); Sahar Lepa, Kiriat Yam (IL); Yoram Weizman, Kfar Vradim (IL)

(73) Assignee: SAP AG, Walldorf (DE)

( * ) Notice: Subject to any disclaimer, the term of this patent is extended or adjusted under 35 U.S.C. 154(b) by 294 days.

(21) Appl. No.: 13/159,836

(22) Filed: Jun. 14, 2011

(65) Prior Publication Data

US 2012/0324432 A1 Dec. 20, 2012

(51) Int. Cl.
*G06F 9/44* (2006.01)
*G06F 11/36* (2006.01)

(52) U.S. Cl.
CPC .............. *G06F 8/30* (2013.01); *G06F 11/3672* (2013.01); *G06F 8/75* (2013.01); *G06F 11/3624* (2013.01)
USPC ............ 717/162; 717/106; 717/116; 717/166

(58) Field of Classification Search
CPC ............. G06F 8/24–8/34; G06F 9/445; G06F 9/4433; G06F 9/44512; G06F 11/3624; G06F 8/75
See application file for complete search history.

(56) References Cited

U.S. PATENT DOCUMENTS

| | | | |
|---|---|---|---|
| 6,938,203 B1 * | 8/2005 | Dimarco et al. ............. 715/209 |
| 7,487,498 B2 * | 2/2009 | Hogg et al. .................. 717/162 |
| 7,516,440 B2 * | 4/2009 | Upton .......................... 717/106 |
| 8,239,823 B2 * | 8/2012 | Stenberg et al. ............. 717/106 |
| 8,539,468 B2 * | 9/2013 | Popov et al. .................. 717/162 |
| 2003/0093769 A1 * | 5/2003 | Kumar ......................... 717/108 |
| 2005/0193266 A1 * | 9/2005 | Subramanian et al. ......... 714/38 |
| 2006/0143597 A1 * | 6/2006 | Alaluf et al. ................. 717/136 |
| 2006/0190771 A1 * | 8/2006 | Hefner ............................ 714/38 |
| 2007/0250481 A1 * | 10/2007 | Fiedler ............................. 707/3 |
| 2008/0127070 A1 * | 5/2008 | Barcia et al. ................. 717/116 |
| 2008/0295117 A1 * | 11/2008 | Videlov ........................ 719/328 |
| 2012/0173490 A1 * | 7/2012 | Gould et al. ................. 707/648 |
| 2013/0152064 A1 * | 6/2013 | Gagliardi ..................... 717/166 |

OTHER PUBLICATIONS

Verwaset et al., Pinocchio: bringing reflection to life with first-class interpreters, Oct. 2010, 16 pages.*
Thies et al., Reflections on outreach programs in CS classes: learning objectives for "unplugged" activities, Feb. 2012, 6 pages.*

* cited by examiner

*Primary Examiner* — Thuy Dao
(74) *Attorney, Agent, or Firm* — Buckley, Maschoff & Talwalkar LLC

(57) ABSTRACT

According to some embodiments, Application Programming Interface (API) source code, including command design patterns, is determined to be executed as a runtime scenario. Class may then be automatically generated as linkable building blocks in accordance with the API source code and command design patterns. For example, API command classes and associated methods may be dynamically read using reflection, and a building block class associated with each API command class may be generated. Runtime readable embedded metadata may be planted in the building block classes, at least some of the metadata being provided by the reflection. According to some embodiments, a logical sequence of the building blocks classes may be linked in accordance with the runtime scenario.

20 Claims, 10 Drawing Sheets

400 ⟶

A command for retrieving the list of limited records based on the search criteria.

Constructor Summary

RetrieveLimitedRecordsCommand(ConnectionAccessor connection)
    Creates an instance.

RetrieveLimitedRecordsCommand(UserSessionContext ctx)
    Creates a new instance of the command by context.

Method Summary

| | |
|---|---|
| void | execute()<br>    Executes the command. |
| SortDefinition | getFieldSortingOrder()<br>    Deprecated. *replaced by ResultDefinition.getFieldSo* |
| int | getPageIndex()<br>    Returns the paging index. |
| int | getPageSize()<br>    Returns the page size. |
| RecordResultSet | getRecords()<br>    Returns the record result set. |
| int | getResultTableMatchCount()<br>    Returns the match count for the result table. |
| FieldId[] | getResultTablePath()<br>    Returns the result table path. |
| Search | getSearch()<br>    Returns the search criteria. |
| int | getSearchTableMatchCount()<br>    Returns the match count for the search table, based on the searc |
| void | setFieldSortingOrder(SortDefinition fieldSorting<br>    Deprecated. *replaced by ResultDefinition.setFieldSo* |
| void | setPageIndex(int pageIndex)<br>    Sets the paging index *(optional)*. 420 |
| void | setPageSize(int pageSize)<br>    Sets the page size *(optional)*. |
| void | setResultTablePath(FieldId[] resultTablePath)<br>    Sets the result table path *(optional)*. 430 |
| void | setSearch(Search search)<br>    Sets the search criteria (required). |

SYSTEMS AND METHODS TO AUTOMATICALLY GENERATE CLASSES FROM API SOURCE CODE

FIELD

Some embodiments relate to systems and methods to automatically generate classes from Application Programming Interface (API) source code. More specifically, some embodiments are associated with the automatic generation of classes as linkable building blocks from API source code to be executed as, for example, a runtime scenario.

BACKGROUND

In some cases, a user might want to execute a runtime scenario to, for example, test Application Programming Interface (API) source code. The API source code might, for example, access and/or modify thousands of records in an enterprise database. Similarly, the API source code might be associated with a logical business flow. Creating such runtime scenarios, however, can be difficult, time consuming, and error prone process. This may be especially true when the user is not familiar with the API layer and/or the inner workings of various Operating System (OS) implementations.

Accordingly, a method and mechanism to efficiently, accurately, and automatically generate runtime scenarios to be executed may be provided in accordance with some embodiments described herein.

BRIEF DESCRIPTION OF THE DRAWINGS

FIG. 4 illustrates an example of software API implemented in a command design pattern in accordance with some embodiments.

DETAILED DESCRIPTION

In some cases, a user might want to execute a runtime scenario to, for example, test API source code. The API source code might, for example, access and/or modify thousands of records in an enterprise database. Similarly, the API source code might be associated with a logical business flow. Creating such runtime scenarios, however, can be difficult, time consuming, and error prone process. This may be especially true when the user is not familiar with the API layer and/or the inner workings of various OS implementations.

Figure 1:
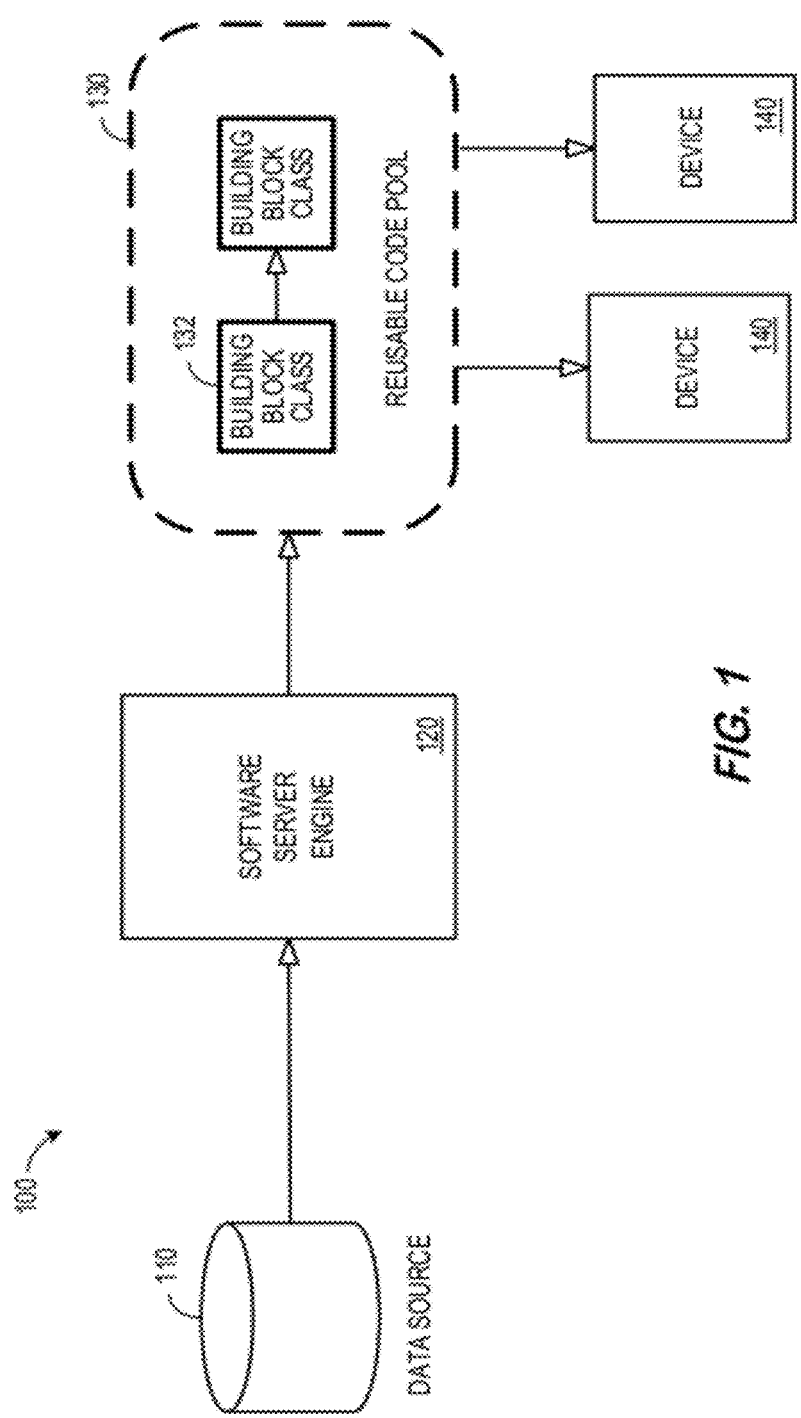
FIG. 1 is a block diagram of a system according to some embodiments.

Accordingly, a method and mechanism to efficiently, accurately, and automatically generate runtime scenarios to be executed may be provided in accordance with some embodiments described herein. For example, FIG. 1 is a block diagram of a system 100 that might be associated with an enterprise. The system 100 includes at least one data source 110 storing API source code to be executed as a runtime scenario. According to some embodiments, multiple data sources may be provided. Different data sources 120 may, for example, be associated with different business applications. According to some embodiments, one or more data sources 120 might be associated with table of an Enterprise Resource Planning ("ERP") system. Note that the records might be stored within physical tables of a database. The database may comprise a relational database such as SAP MaxDB, Oracle, Microsoft SQL Server, IBM DB2, Teradata and the like. As another example, the data sources 120 might be associated with a multi-dimensional database, an eXtendable Markup Language ("XML") document, or any other structured data storage system. The physical tables of a database may be distributed among several relational databases, dimensional databases, and/or other data sources.

A software server engine 120 may receive the API source code from the data source 110. The software server engine 120 may then perform operations in accordance with any of the embodiments described here. For example, the software server engine 120 may dynamically read API source command classes using reflection to help create a building block class 132 for each API command class. The software server engine 120 may also plant runtime readable embedded metadata (e.g., Java annotations) in the building block classes 132 to help a subsequent linking of blocks in a logical sequence in accordance with the runtime scenario. The linked building block classes 132 may be stored in a reusable runtime pool 130 to be accessed by multiple users and/or devices 140. The devices 140 might be associated with, for example, Personal Computers (PC), servers, smart phones and/or other mobile devices.

Note that FIG. 1 represents a logical architecture according to some embodiments, and actual implementations may include more or different components arranged in other manners. Moreover, each system described herein may be implemented by any number of devices in communication via any number of other public and/or private networks. Two or more of devices may be located remote from one another and may communicate with one another via any known manner of network(s) and/or a dedicated connection. Further, each device may comprise any number of hardware and/or software elements suitable to provide the functions described herein as well as any other functions. Other topologies may be used in conjunction with other embodiments.

All systems and processes discussed herein may be embodied in program code stored on one or more computer-readable media. Such media may include, for example, a floppy disk, a CD-ROM, a DVD-ROM, magnetic tape, OR solid state Random Access Memory (RAM) or Read Only Memory (ROM) storage units. Embodiments are therefore not limited to any specific combination of hardware and software.

Figure 2:
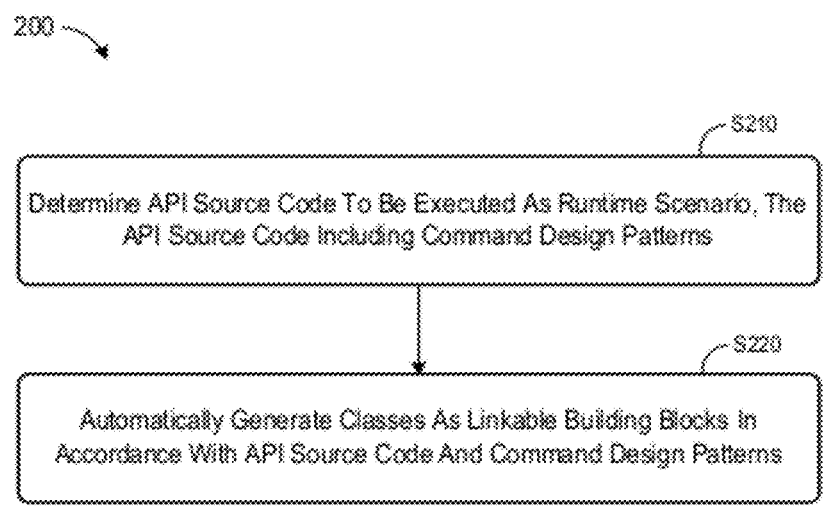
FIG. 2 is a flow diagram of a process according to one embodiment that might be implemented.

FIG. 2 is a flow diagram of a process 200 that might be associated with the software server engine 120 of FIG. 1 according to some embodiments. Note that all processes described herein may be executed by any combination of hardware and/or software. The processes may be embodied in program code stored on a tangible medium and executable by a computer to provide the functions described herein. Further note that the flow charts described herein do not imply a fixed order to the steps, and embodiments of the present invention may be practiced in any order that is practicable.

At S210, API source code to be executed as a runtime scenario may be determined by the software server engine 120. Moreover, the API source code may include "command design patterns." As used herein, the phrase "command design pattern" may refer to object-oriented programming wherein an object is used to represent and/or encapsulate the information needed to call a method at a later time. This information might include, for example, a method name, an object that owns the method, and/or values for the method parameters.

According to some embodiments, the API source code may be associated with a database (e.g., an ERP database) storing records. For example, the API source code might be associated with record retrieval, record creation, record modification, and/or record deletion. Note, however, that the API source code may be associated with operations other than those involving databases.

At S220, classes may be automatically generated as linkable building blocks in accordance with the API source code and command design patterns. According to some embodiments, this automatic generation of classes may be associated with a software server or software server engine. Moreover, the linked logical sequence of building blocks classes might be accessed by a user via a device communicating with the software server. For example, a user might access components in a reusable code block to create a test scenario via a PC, a smart phone, and/or a web interface.

Figure 3:
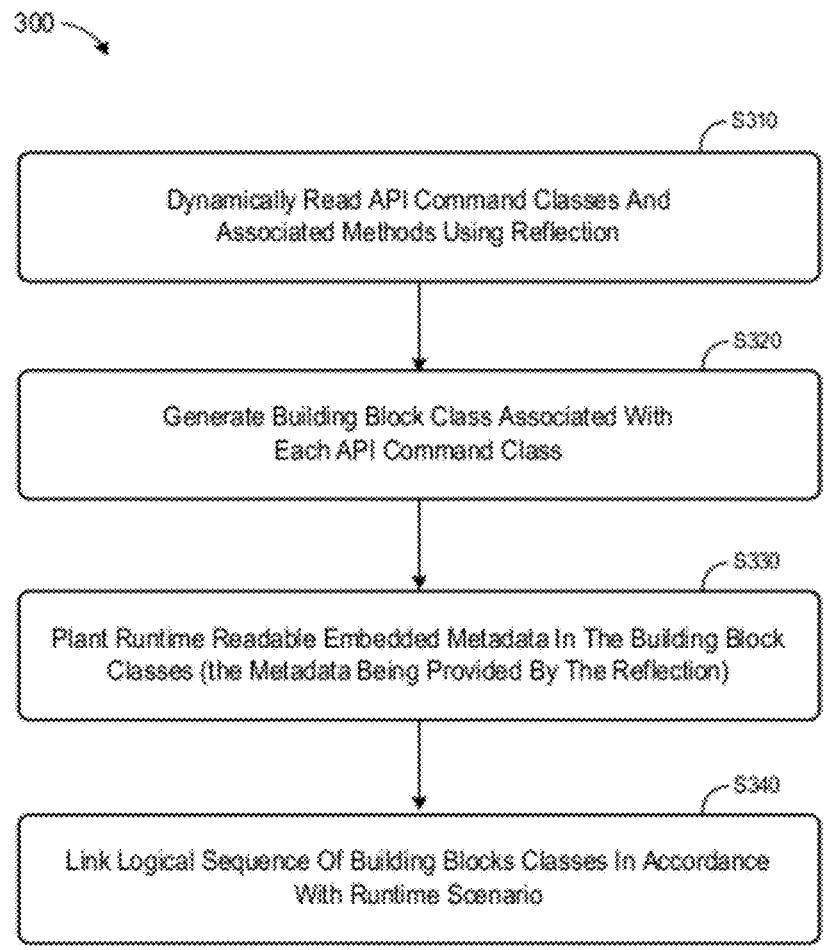
FIG. 3 is a flow diagram of a process according to some embodiments disclosed herein.

Note that the automatic generation of classes may be performed in a number of different ways. For example, FIG. 3 is a flow diagram of a process 200 that might be associated with the software server engine 120 of FIG. 1 according to some embodiments. At S310, the software server engine 120 might dynamically read API command classes and associated methods using "reflection." As used herein, the term "reflection" may refer to, for example, an operation used for observing and/or modifying program execution at runtime. In some cases, a reflection-oriented program component may monitor execution of an enclosure of code and modify itself according to a desired goal related to the enclosure. In Java, for example, reflection may allow for the inspection of classes, interfaces, fields and methods at runtime and/or allow instantiation of new objects and invocation of methods.

At S320, a building block class associated with each API command class may be generated. The automatically generated building block classes may be associated with, for example, input classes, output classes, and/or command classes. According to some embodiments, a method associated with a building block class may correspond to an input class if the method name starts with "set" or "add." Similarly, a method associated with a building block class might correspond to an output class if the method name starts with "get." Further note that each building block class might be associated a primitive input associated with user input and/or non-primitive input associated with a dynamic input of data from another building block. According to some embodiments, primitive inputs may be defined by a user via a Graphical User Interface ("GUI").

At S330, runtime readable embedded metadata may be planted in the building block classes, at least some of the metadata being provided by the reflection. By way of example, Java annotations may be used to plant metadata in the building block classes. At S340, a logical sequence of the building blocks classes may be linked in accordance with the runtime scenario. For example, an output of one building block class is assigned as in input to another building block class. According to some embodiments, the logically linked sequence of building blocks classes is reusable for other runtime scenarios. For example, the logically linked sequence of building block classes might be stored in a reusable code pool accessed by API consumers, a development team, a quality assurance team, and/or a software customer.

Thus, embodiments described herein may be applicable for API's that are based on command design patterns. Dynamically reading API source command classes using reflection may help generate a building block class from each API command class. Moreover, planting runtime readable embedded metadata (e.g., Java annotations) in the block classes may help a user link a logical sequence of blocks to a scenario.

FIG. 4 illustrates an example 400 of software API implemented in a command design pattern in accordance with some embodiments. In particular, the example 400 may be associated with a command for retrieving a list of limited records based on a search criteria. Although some embodiments are described herein are associated with a Java API, note that the implementations may be associated with any other appropriate programming language.

Each operation which may be done on a software server may be represented by a "command class." In some cases, before the operation execution via the command class, the command class instance may consume objects which define the operation nature. These classes may be referred to as "Input Classes." In some cases, after an operation has been executed data objects may be retrieved from the command class. These classes may be referred to as "Output Classes." Note that a class might be an Input Class to one Command and an Output Class to another command. Thus, the API may contain: (1) Command Classes (where a command is always command), (2) Input/Output Classes (which may change roles according to the command operation).

Referring again to FIG. 4, the example 400 is associated with a retrieve records operation (commonly used in information systems). Note that if the software maintains an API in command design pattern, there will be a Command Class to represent the operation. In particular, the example 400 illustrates the content of a RetrieveLimitedRecordsCommand class. Each method in the command class starting with the characters "set" or "add" may define one or more Input Classes for the command (and each parameter of the method may be an input class). Similarly, each method in the command class starting with the characters "get" may define an Output Class for the command (the method return type).

The process may initially create an object from the command class, and the set the Input Classes using the "set" or "add" methods. The process may execute the command using an execute method and then get output classes (if needed) using the "get" methods. With respect to the example 400 of FIG. 4, the RecordResultSet 410 may be an output class to the command. Further, the setPageSize (int pageSize) 420 may represent how many records to retrieve and may be a primitive input class as described with respect to FIG. 6. Moreover, the setSearch (Search search) 430 may be an input class to the command.

Figure 5:
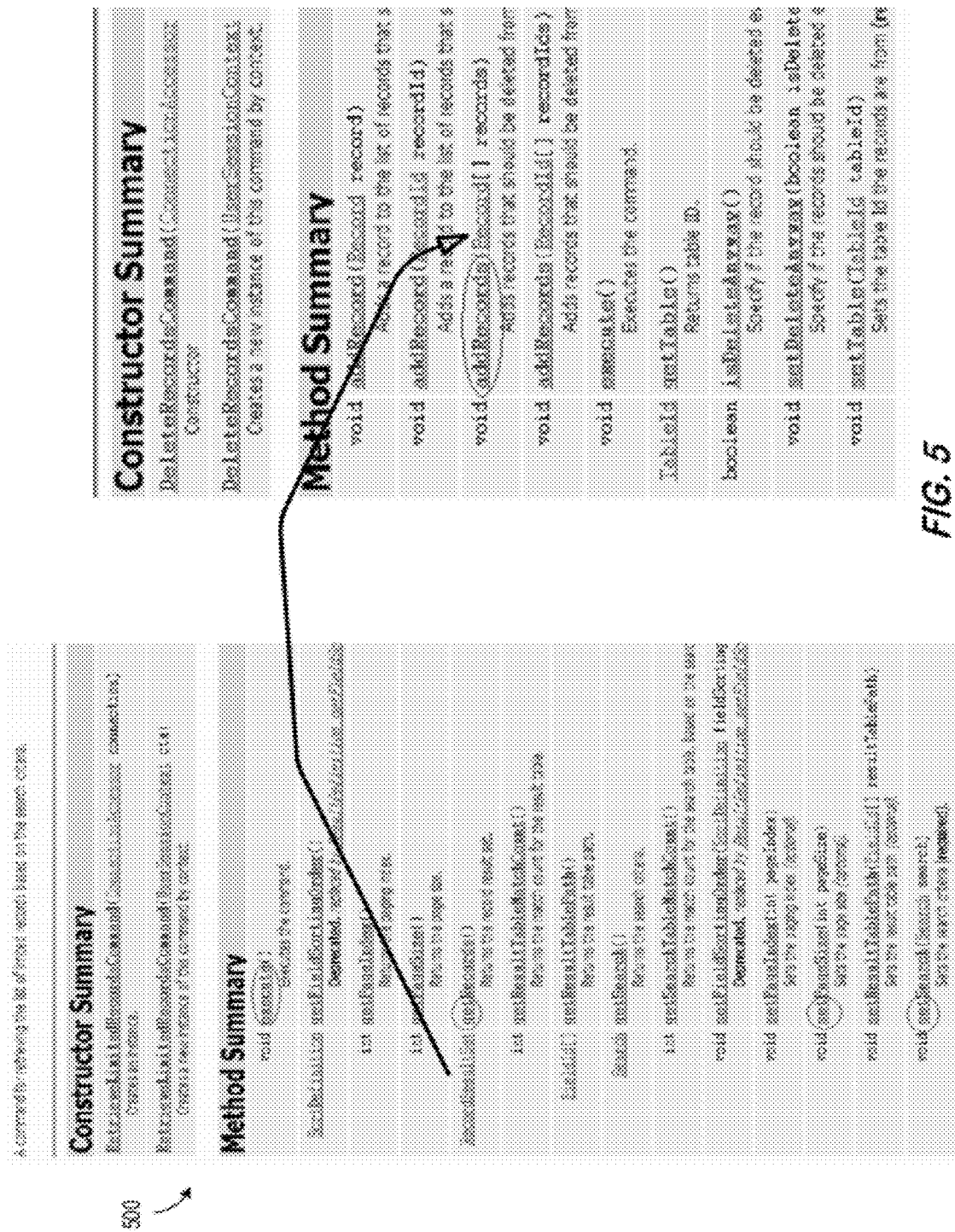
FIG. 5 illustrates a scenario to delete records from a database according to some embodiments.

FIG. 5 illustrates a scenario to delete records from a database according to some embodiments. Note that an automatic scenario may be associated with a sequence of logical operations, such as a sequence of logical executions of commands. Consider the example 500 illustrated in FIG. 5, which is associated with a deletion of records. Note that in order to delete records, the command may need to know which records should be deleted. Therefore, a RetrieveRecordsCommand may be executed and then a DeleteRecordsCommand may be executed.

In this example, the process may create a RetrieveRecordsCommand instance. The process may then set input classes using "set" and/or "add" methods. Next, the process may execute the command using execute method, and use a getRecords( )method in order to get the Output Class. RecordResultDefinition may be associated with an array of the retrieved records, and Record[ ] may be extracted from this object. The process may then create a DeleteRecordsCommand instance, and set input classes using "set" and/or "add" methods. Among these, the process may set the Record[ ] in addRecords( ) to specify which records to delete as illustrated by the arrow in FIG. 5. Finally, the command may be executed in order to delete the appropriate records. As a result, a logical sequence of two commands may provide a simple automatic scenario.

According to some embodiments, each API command may be associated with a corresponding building block class. In this way, a user can look at the building block class as a management unit for the represented command. The API code (command classes and input/output classes) may already exist and facilitate an extension of the command class functionality in order to simplify scenario assembling (e.g., connections between operations). The building block class may set the Input Classes into the command, execute, and extract the Output Classes as appropriate. Note that building block class may be reusable class once it is created. For example, other users may access it to perform a test case and/or command functionality (assuming the API source has not changed).

The building block class may contain the command class, and a scenario may be constructed as a logical sequence of building block classes. Note that the building block class may, according to some embodiments, represent each Input Class and Output Class of the Command in Keys in order to ease Input and Output between building clock classes. Further, the output of a first building block class may be an input to a second building block class. Moreover, each building block class may pass output to any other building block class in a scenario.

Figure 6:
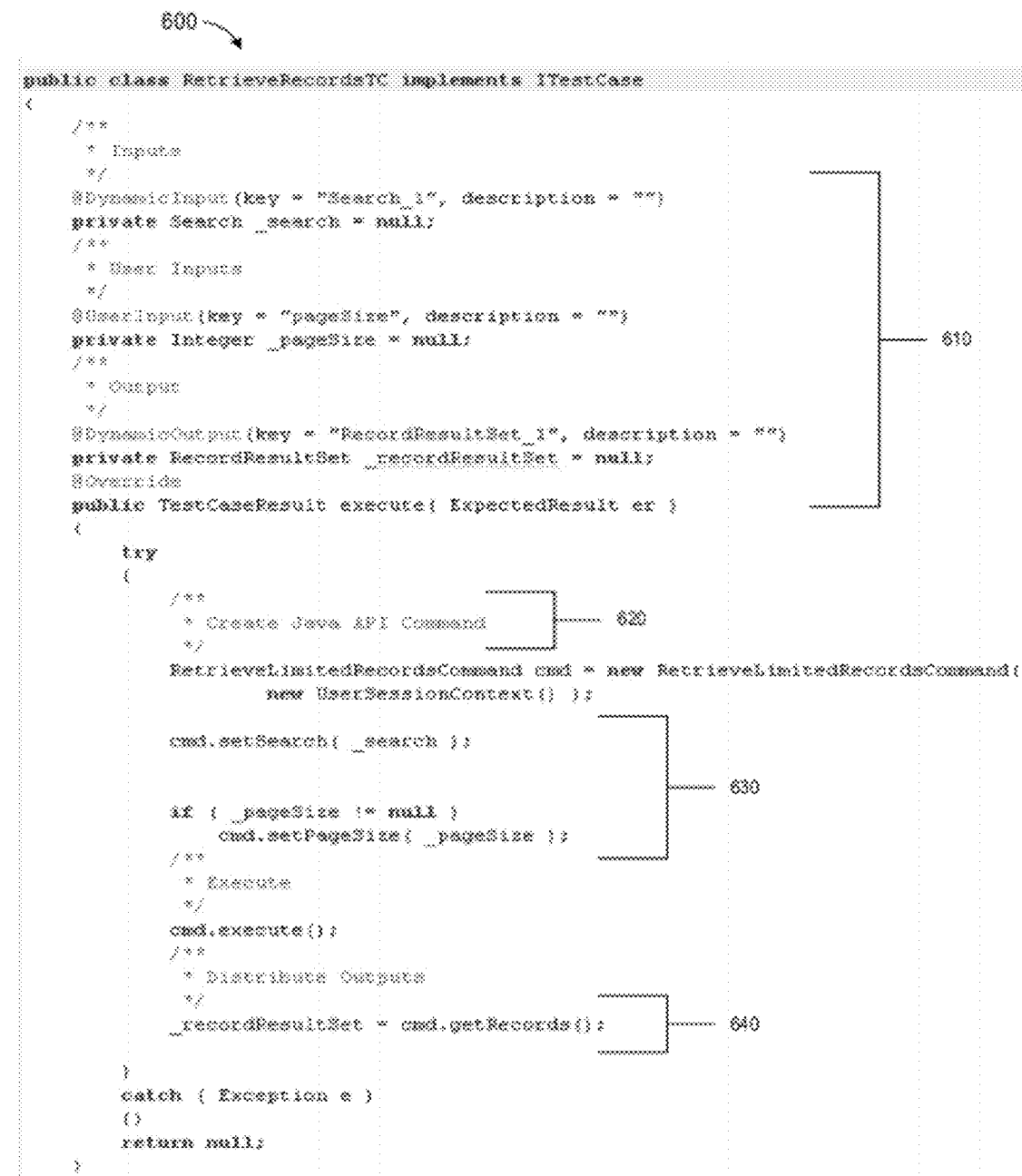
FIG. 6 illustrates an example associated with a retrieve records command in accordance with some embodiments.

FIG. 6 illustrates an example 600 associated with a retrieve records command in accordance with some embodiments. Initially, a code portion 610 may define a key for each input and output. Note that there may be a difference between a "primitive" input class and a "non-primitive" input class. For example, the code portion 610 includes both a primitive input, namely @UserInput(key="pageSize", description=" "), associated with data provided by a user who composes a scenario and a non-primitive input, namely @DynamicInput (key="Search_1", description=" "), associated with a dynamic input that is an output of previous building block class in the scenario. The code portion 610 also includes a dynamic output, namely @DynamicOutput (key="RecordResultSet_1", description=" "), that will be an input to another building block class in the scenario.

Next, a code portion 620 may create a command instance and the building block class example 600 will contain the command, namely RetrieveLimitedRecordsCommand cmd=new RetriveLimitedRecordsCommand (new UserSessionContext( )). A code portion 630 may then dynamically set the input classes, followed by execution of the command, namely cmd.execute( ). Finally a code portion 640 may get command output outputs via code generated automatically.

Figure 7:
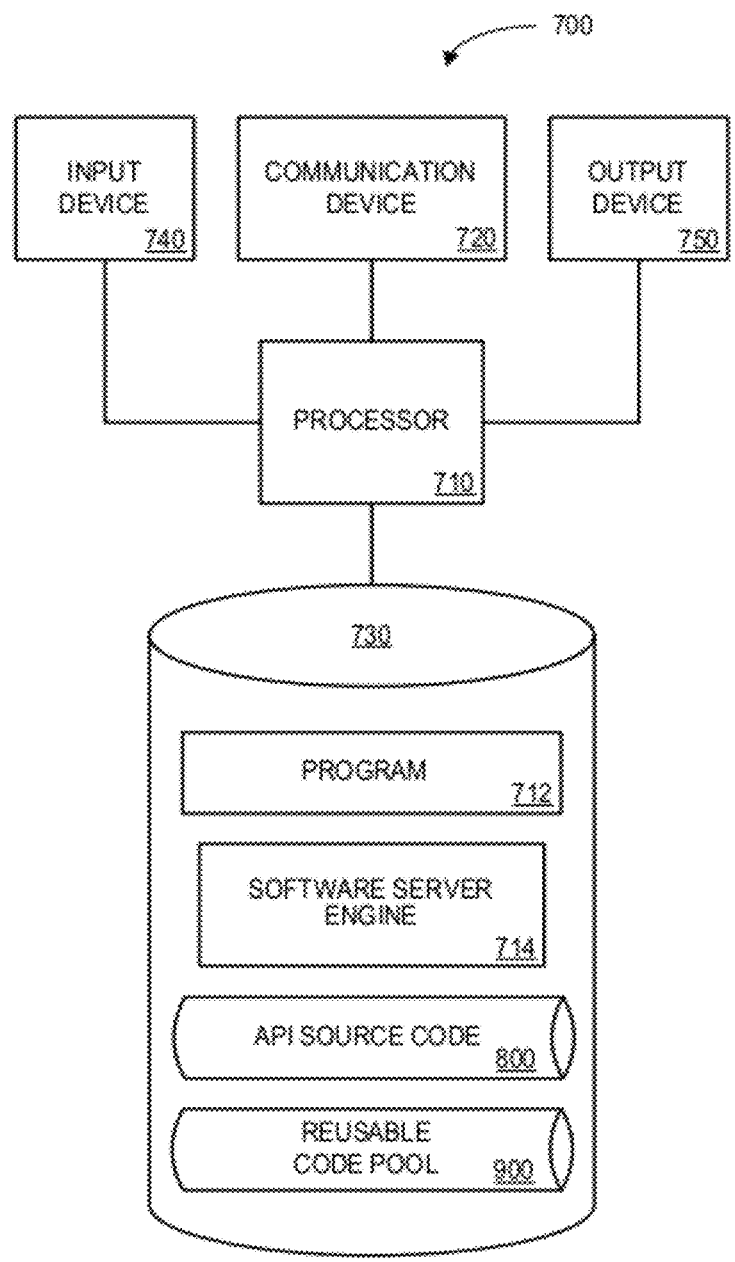
FIG. 7 is a block diagram of a system according to some embodiments.

FIG. 7 is a block diagram overview of a software server engine 700 according to some embodiments. The software server engine 700 may be, for example, associated with any of the devices described herein. The software server engine 700 comprises a processor 710, such as one or more commercially available Central Processing Units (CPUs) in the form of one-chip microprocessors, coupled to a communication device 720 configured to communicate via a communication network (not shown in FIG. 7). The communication device 720 may be used to communicate, for example, with one or more remote data sources. The software server engine 700 further includes an input device 740 (e.g., a mouse and/or keyboard to enter primitive inputs) and an output device 750 (e.g., a computer monitor to display information about a building block class and/or a scenario).

The processor 710 communicates with a storage device 730. The storage device 730 may comprise any appropriate information storage device, including combinations of magnetic storage devices (e.g., a hard disk drive), optical storage devices, and/or semiconductor memory devices. The storage device 730 stores a program 712 and/or software server engine application 714 for controlling the processor 710. The processor 710 performs instructions of the programs 712, 714, and thereby operates in accordance with any of the embodiments described herein. For example, the processor 710 may get command pattern software API source code, locate command classes, create building block classes, and/or generate a scenario by linking a series of building block classes.

The programs 712, 714 may be stored in a compressed, uncompiled and/or encrypted format. The programs 712, 714 may furthermore include other program elements, such as an operating system, a database management system, and/or device drivers used by the processor 710 to interface with peripheral devices.

As used herein, information may be "received" by or "transmitted" to, for example: (i) the software server engine 700 from another device; or (ii) a software application or module within the software server engine 700 from another software application, module, or any other source.

According to some embodiments, the storage device 730 may further store API source code 800 including command design patterns. Note that the API source code might instead be received from a remote data store via communication device 720. The storage device 730 may further store a reusable code pool 900 storing building block classes and/or scenarios (e.g., linked sequences of building block classes).

Figure 8:
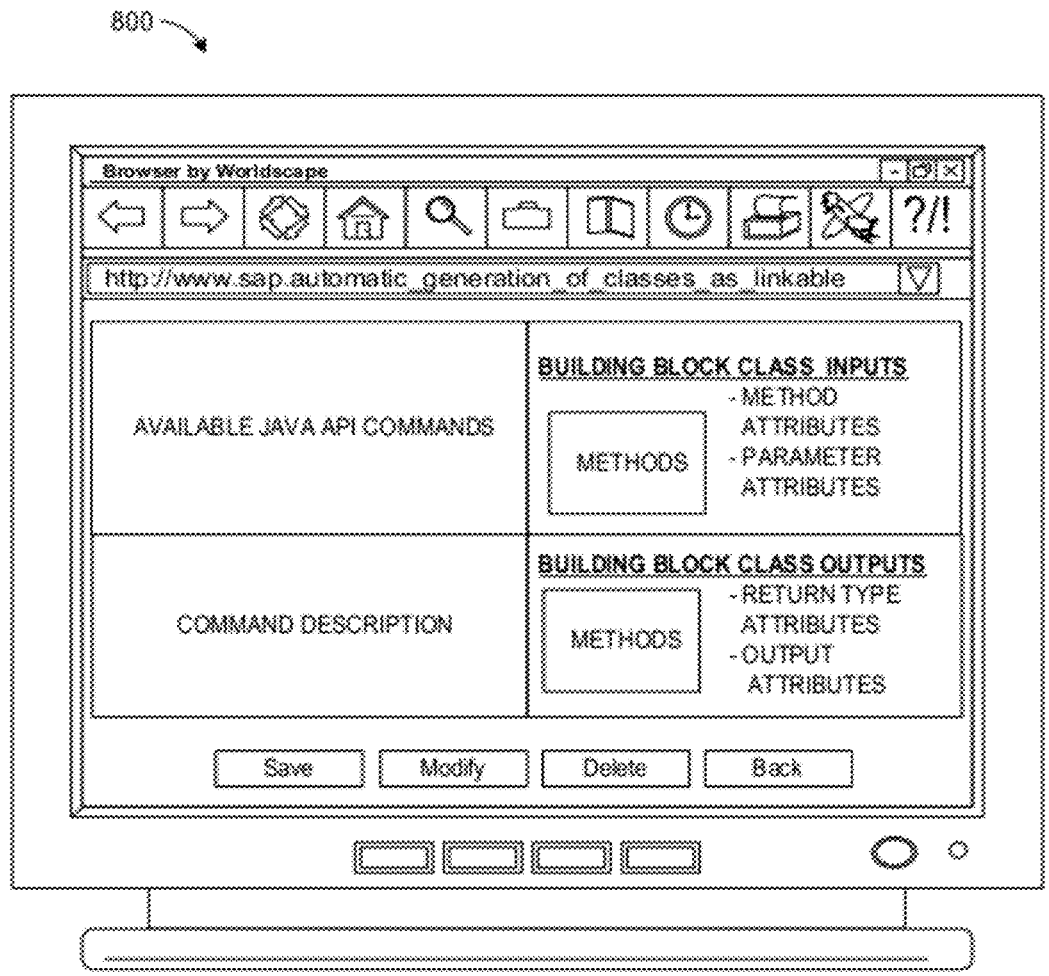
FIG. 8 illustrates a graphical user interface according to some embodiments.

Users may then access the reusable code pool 900 to create and/or modify building block classes and/or scenarios. For example, FIG. 8 illustrates a GUI 800 according to some embodiments. In particular, the GUI 800 may include a screen area (upper left in FIG. 8) to display and/or allow for the selection of available Java API commands. Similarly, the GUI 800 may include a screen area (lower left in FIG. 8) to display a command description associated with a selected Java API commands. Further, the GUI 800 may include a screen area (upper right in FIG. 8) to display and/or allow for the selection of building block class inputs, associated including methods, method attributes, and/or parameter attributes. Finally, the GUI 800 may include a screen area (lower right in FIG. 8) to display and/or allow for the selection of building block class outputs, including associated methods, return type attributes, and/or building block class output attributes.

Thus, some embodiments may be applicable for APIs that are based on command design patterns. Building block classes may be generated using dynamically read API source command classes via reflection, and runtime readable embedded metadata (e.g., Java Annotations) may be planted into the building block classes to facilitate linking the building block classes into a logical sequence scenario. The linkable building block classes may therefore provide an ability to compose test scenarios simulating automatic logical business flows on various OS. Moreover, enhanced efficiency may be provided for an API consumer enabling him or her to allocate more time focused on business logic (and thus, reduce coding time). In addition, a common convention and reusable code pool may be provide for use by API consumers, including development teams, quality teams, and/or software customers.

Moreover, some embodiments may provide robust readiness tests that customers may perform before upgrading their systems and allow accelerated API infrastructure layer construction for development groups. Still further, some embodiments may ease automatic test scenario composition for quality assurance teams and allow for the implementation of system business scenarios utilizing APIs.

The following illustrates various additional embodiments and do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although embodiments have been described with respect to particular types of data, note that embodiments may be associated with other types of information. For example, sales orders, financial information, and health data may be processed in accordance with any of the embodiments described herein.

Figure 9:
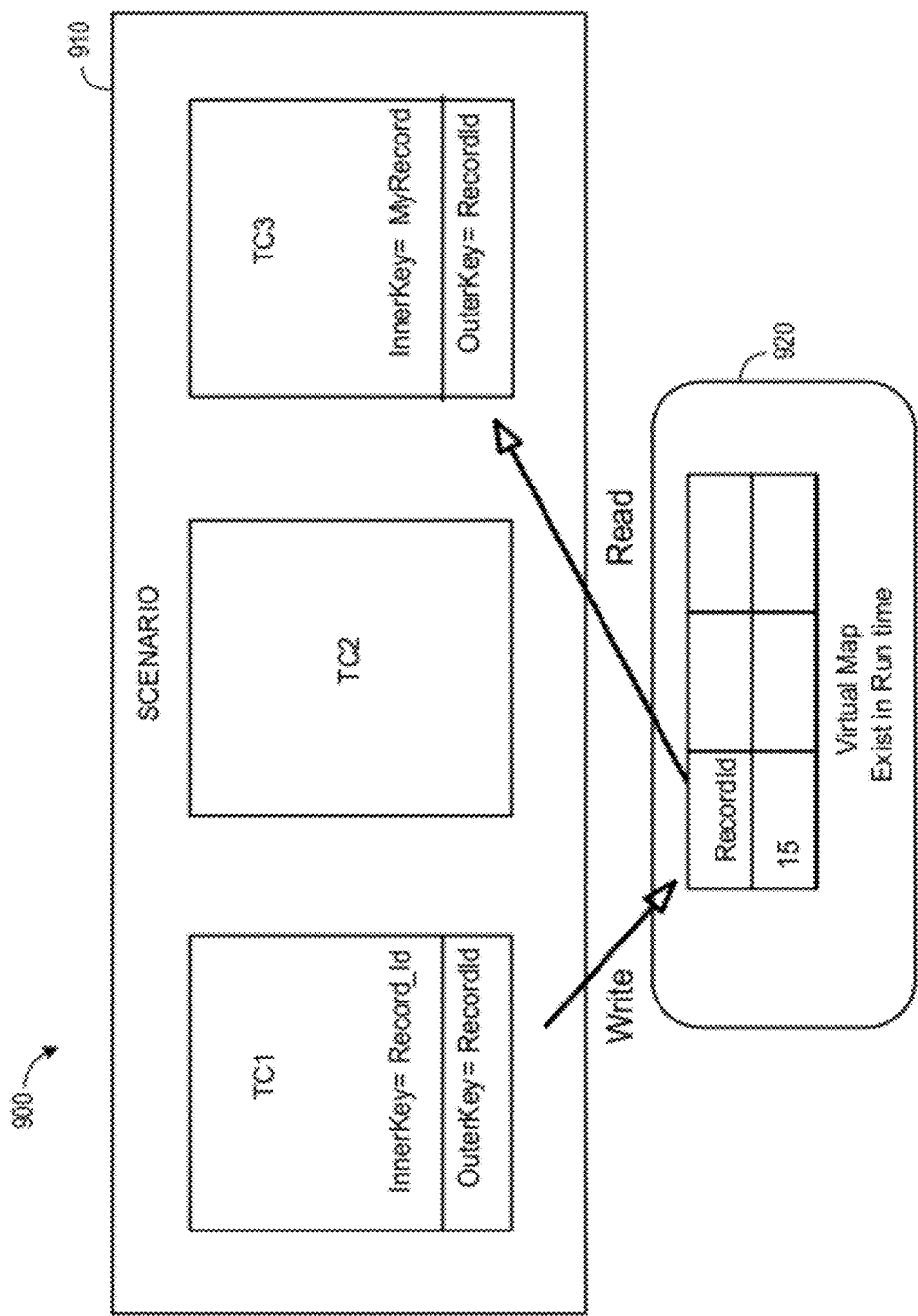
FIG. 9 illustrates an example associated with a simple use case scenario in accordance with some embodiments.

As described herein a building block class may represent each Input Class and Output Class of the Command in Keys in order to ease Input and Output between building clock classes. Further, the output of a first building block class may be an input to a second building block class. Note that each building block class may pass output to any other building block class in a scenario. As described with respect to FIG. 6, a retrieve records command may, for example, be associated with a code portion 610 that defines a key for each input and output. Consider now FIG. 9, which illustrates an example 900 associated with a simple use case scenario 910 in accordance with some embodiments. Note that one reason to give Keys to each input/output may be the ability to refer the key which is given in the readable metadata comments (e.g., annotations) as an "Inner Key."

While a user of an application may define a scenario from a building block pool, he or she may need to define an "Outer Key" for each output and map the output to inputs according to the Outer key. For example, the scenario 910 of FIG. 9 includes test cases TC1 (associated with a write to a virtual map 920 that exists in run time), TC2, and TC3 (associated with a read from the virtual map). If all examples were as simple as the scenario 910 of FIG. 9, the implementation of a separate Outer Key might not be required.

Figure 10:
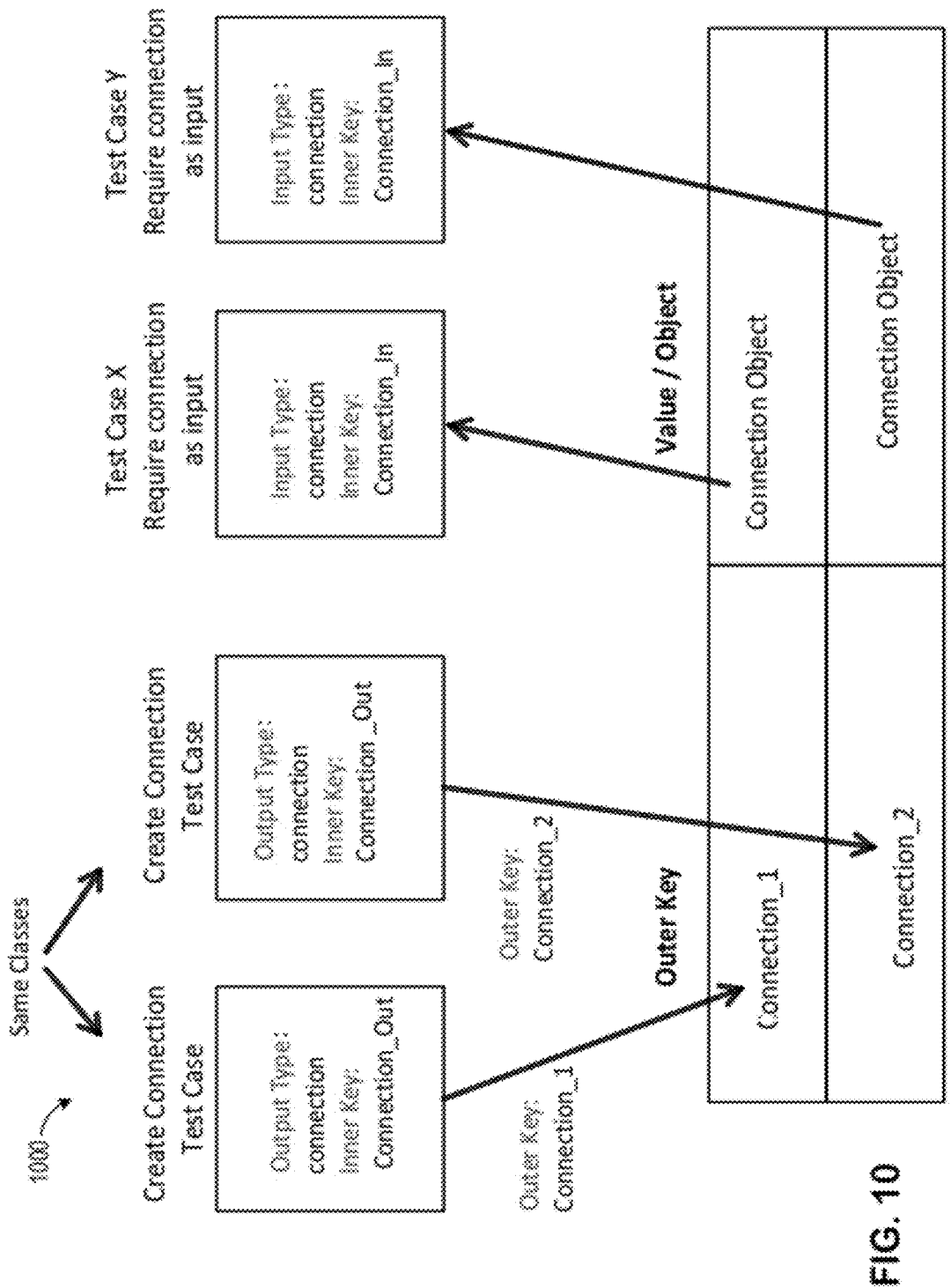
FIG. 10 illustrates an example associated with a more complex use case scenario in accordance with some embodiments.

Consider, however, FIG. 10 which illustrates an example 1000 associated with a more complex use case scenario in accordance with some embodiments. In this case, two connection test cases of the same class may be created (having Outer Key: Connection_1 and Outer Key: Connection_2) along with test case X and test case Y, which each require a connection as an input. That is, the test case responsible for connection creation may be generic such that it omits as an output a connection object from different variation according to inputs. For example, two databases might need to be connected with during a scenario, and yet there may be only a single test case that creates connections. As a result, if the Inner Key is utilized by the metadata of a test case (e.g., as was done in the "Virtual Map" 920 illustrated in FIG. 9) it may only be possible to contain a single connection at a given time (e.g., because a second connection would override the first connection since they have the same key). To avoid such a result, an Outer Key may provide the flexibility to maintain multiple objects of the same type in a virtual map even when they are created by the same test case.

Moreover, while embodiments have been illustrated using particular programming languages, embodiments may be implemented in any other of a number of different ways. For example, some embodiments might be associated with C++ or any other programming language.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A computer implemented method, comprising:
   determining Application Programming Interface (API) source code to be executed as a runtime scenario, wherein the API source code includes command design patterns; and
   automatically generating classes as a series of linkable building blocks in accordance with the API source code and command design patterns wherein an output of a first class is an input to a second class and an output of the second class is an input to a third class, wherein the first class, the second class and the third class are distinct classes, and wherein command design patterns comprise an object oriented object to encapsulate information to later call a method, wherein said automatic generation includes:
   dynamically reading API command classes and associated methods using reflection;
   generating a building block class associated with each API command class; and
   planting runtime readable embedded metadata in the building block classes, at least some of the metadata being provided by the reflection.

2. The method of claim 1, wherein the runtime readable embedded metadata comprises Java Annotations.

3. The method of claim 1, further comprising:
   linking a logical sequence of the building blocks classes in accordance with the runtime scenario.

4. The method of claim 3, wherein the automatically generated building block classes are associated with at least one of: (i) an input class, (ii) an output class, or (iii) a command class.

5. The method of claim 4, wherein a method associated with a building block class corresponds to an input class if the method name starts with "set" or "add."

6. The method of claim 4, wherein a method associated with a building block class corresponds to an output class if the method name starts with "get."

7. The method of claim 3, wherein at least one building block class is associated with at least one of: (i) a primitive input associated with user input, or (ii) a non-primitive input associated with a dynamic input of data from another building block.

8. The method of claim 7, wherein primitive inputs are defined by a user via a graphical user interface.

9. The method of claim 3, wherein an output of one building block class is assigned as in input to another building block class.

10. The method of claim 3, wherein the logically linked sequence of building blocks classes is reusable for other runtime scenarios.

11. The method of claim 10, wherein the logically linked sequence of building block classes is stored in a reusable code pool accessed by at least one of: (i) API consumers, (ii) a development team, (iii) a quality assurance team, or (iv) a software customer.

12. The method of claim 3, wherein the linked logical sequence of building blocks classes is associated with a database storing records, and further wherein at least one building block class is associated with: (i) record retrieval, (ii) record creation, (iii) record modification, or (iv) record deletion.

13. The method of claim 3, wherein said automatic generation is associated with a software server.

14. The method of claim 13, wherein the linked logical sequence of building blocks classes is accessed by a user via a device communicating with the software server, the device being associated with at least one of: (i) a personal computer, (ii) a smart phone, or (iii) a web interface.

15. The method of claim 1, wherein the runtime readable embedded metadata facilitates linking the building blocks into a logical sequence scenario.

16. The method of claim 1, wherein the runtime readable embedded metadata facilitates linking blocks in a logical sequence in accordance with the runtime scenario.

17. A non-transitory, computer-readable medium storing program code executable by a computer to:

determine Application Programming Interface (API) source code to be executed as a runtime scenario, wherein the API source code includes command design patterns;

automatically generate classes as a series of linkable building blocks in accordance with the API source code and command design patterns wherein an output of a first class is an input to a second class and an output of the second class is an input to a third class, wherein the first class, the second class and the third class are distinct classes, and, wherein command design patterns comprise an object oriented object to encapsulate information to later call a method, wherein said automatically generating includes:

dynamically read API command classes and associated methods using reflection;

generate a building block class associated with each API command class; and plant runtime readable embedded metadata in the building block classes, at least some of the metadata being provided by the reflection.

18. The medium of claim 17, further storing instructions executable by the computer to:

link a logical sequence of the building blocks classes in accordance with the runtime scenario.

19. A system, comprising:

a processor;

a non-transitory, computer-readable medium storing program code executable by the processor to:

determine Application Programming Interface (API) source code to be executed as a runtime scenario, wherein the API source code includes command design patterns; and automatically generate classes as a series of linkable building blocks in accordance with the API source code and command design patterns wherein an output of a first class is an input to a second class and an output of the second class is an input to a third class, wherein the first class, the second class and the third class are distinct classes, and, wherein command design patterns comprise an object oriented object to encapsulate information to later call a method, wherein said automatic generation includes:

dynamically reading API command classes and associated methods using reflection;

generating a building block class associated with each API command class; and planting runtime readable embedded metadata in the building block classes, at least some of the metadata being provided by the reflection.

20. The system of claim 19, wherein the runtime readable embedded metadata comprises Java Annotations.

* * * * *